United States Patent
Masuda

(10) Patent No.: US 11,081,699 B2
(45) Date of Patent: Aug. 3, 2021

(54) METHOD FOR MANUFACTURING ELECTROCHEMICAL DEVICE ELECTRODE

(71) Applicant: ZEON CORPORATION, Tokyo (JP)

(72) Inventor: Azusa Masuda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 272 days.

(21) Appl. No.: 15/305,583

(22) PCT Filed: May 12, 2015

(86) PCT No.: PCT/JP2015/063561
§ 371 (c)(1),
(2) Date: Oct. 20, 2016

(87) PCT Pub. No.: WO2015/178241
PCT Pub. Date: Nov. 26, 2015

(65) Prior Publication Data
US 2017/0040613 A1    Feb. 9, 2017

(30) Foreign Application Priority Data

May 20, 2014 (JP) .............................. JP2014-104041
May 20, 2014 (JP) .............................. JP2014-104042

(51) Int. Cl.
| | | |
|---|---|---|
| *H01M 4/62* | (2006.01) | |
| *H01G 11/30* | (2013.01) | |
| *H01M 4/13* | (2010.01) | |
| *H01M 4/131* | (2010.01) | |
| *H01G 11/48* | (2013.01) | |
| *H01G 11/50* | (2013.01) | |
| *H01M 4/134* | (2010.01) | |
| *H01M 4/505* | (2010.01) | |
| *H01M 4/525* | (2010.01) | |
| *H01M 4/1395* | (2010.01) | |
| *H01M 4/38* | (2006.01) | |

(52) U.S. Cl.
CPC ............ *H01M 4/622* (2013.01); *H01G 11/30* (2013.01); *H01G 11/48* (2013.01); *H01G 11/50* (2013.01); *H01M 4/13* (2013.01); *H01M 4/131* (2013.01); *H01M 4/134* (2013.01); *H01M 4/624* (2013.01); *H01M 4/1395* (2013.01); *H01M 4/386* (2013.01); *H01M 4/505* (2013.01); *H01M 4/525* (2013.01)

(58) Field of Classification Search
None
See application file for complete search history.

(56) References Cited

U.S. PATENT DOCUMENTS

| | | | | |
|---|---|---|---|---|
| 2002/0061440 A1* | 5/2002 | Suzuki | .................. | H01M 4/131 |
| | | | | 429/217 |
| 2005/0034299 A1* | 2/2005 | Kurihara | ................ | H01G 9/155 |
| | | | | 29/623.5 |
| 2005/0132562 A1* | 6/2005 | Saito | .................... | H01M 4/0404 |
| | | | | 29/623.5 |
| 2008/0038639 A1* | 2/2008 | Ohata | ...................... | H01M 4/13 |
| | | | | 429/231.95 |
| 2013/0189589 A1* | 7/2013 | Hashaikeh | ............. | H01G 9/028 |
| | | | | 429/308 |
| 2014/0170486 A1 | 6/2014 | Matsumura et al. | | |
| 2014/0225300 A1* | 8/2014 | Shibata | ................... | B30B 11/18 |
| | | | | 264/171.13 |

FOREIGN PATENT DOCUMENTS

| | | | |
|---|---|---|---|
| JP | 2001176757 A | 6/2001 | |
| JP | 4219705 B2 | 2/2009 | |
| JP | 2013041821 A | 2/2013 | |
| WO | WO-2013031854 A1 * | 3/2013 | ............. B30B 11/18 |

OTHER PUBLICATIONS

Sep. 11, 2017, Extended European Search Report issued by the European Patent Office in the corresponding European Patent Application No. 15796229.1.
Aug. 18, 2015, International Search Report issued in the International Patent Application No. PCT/JP2015/063561.
Nov. 22, 2016, International Preliminary Report on Patentability issued in the International Patent Application No. PCT/JP2015/063561.

* cited by examiner

*Primary Examiner* — Robert S Carrico
(74) *Attorney, Agent, or Firm* — Kenja IP Law PC

(57) ABSTRACT

The present invention provides composite particles for an electrochemical device electrode which makes it possible to manufacture an electrochemical device exhibiting excellent high temperature storage characteristics. The composite particles for an electrochemical device electrode of the present invention contain an electrode active material (A), a particulate binder resin (B), a water-soluble polymer (C), and a composite (D) of a water-soluble polymer (d') and crystalline cellulose (d").

4 Claims, No Drawings

METHOD FOR MANUFACTURING ELECTROCHEMICAL DEVICE ELECTRODE

TECHNICAL FIELD

The present invention relates to composite particles for an electrochemical device electrode and a method for manufacturing composite particles for an electrochemical device electrode.

BACKGROUND ART

An electrochemical device such as a lithium ion secondary battery, an electric double layer capacitor, or a lithium ion capacitor, which is compact and lightweight, has high energy density, and is further capable of repeatedly charging and discharging, has rapidly expanded the demand by utilizing the characteristics. The lithium ion secondary battery is used in a mobile field such as a mobile phone or a notebook personal computer, as it has a relatively high energy density. Meanwhile, the electric double layer capacitor is used as a small memory backup power supply for a personal computer or the like, as it can be charged and discharged rapidly. In addition, the electric double layer capacitor is expected to be applied as an auxiliary power supply for an electric vehicle or the like. Furthermore, the lithium ion capacitor taking advantages of the lithium ion secondary battery and the electric double layer capacitor is considered for applying to a use to which the electric double layer capacitor is applied and a use the specifications of which the electric double layer capacitor cannot satisfy, as it has a higher energy density and a higher output density than the electric double layer capacitor. Among these electrochemical devices, particularly in the lithium ion secondary battery, not only an application thereof to an in-vehicle use for a hybrid electric vehicle, an electric vehicle, or the like but also an application thereof to a power storage use has been considered recently.

An expectation for these electrochemical devices is high. Meanwhile, further improvement in the electrochemical devices, such as lowering resistance, increasing capacity, or improving mechanical characteristics and productivity is desired with expansion and development of the uses. In these circumstances, a more productive method for manufacturing an electrode for an electrochemical device is desired.

An electrode for an electrochemical device is usually obtained by laminating an electrode active material layer, which is formed by binding an electrode active material and an electroconductive agent used as necessary with a binder resin, on a current collector. Examples of the electrode for an electrochemical device include an applied electrode which is manufactured by applying a slurry for an applied electrode including an electrode active material, a binder resin, an electroconductive agent, and the like on a current collector and removing a solvent with heat or the like. However, it is difficult to manufacture a uniform electrochemical device due to migration of the binder resin or the like. Further, this method requires a high cost, adversely affects the working environment, and also tends to cause an increase in size of the manufacturing apparatus.

On the other hand, a method for obtaining an electrochemical device including a uniform electrode active material layer by obtaining composite particles and powder-molding thereof is proposed. As a method for manufacturing such an electrode active material layer, for example, Patent Literature 1 discloses a method for forming an electrode active material layer by spraying and drying a slurry for composite particles including an electrode active material, a binder resin, and a dispersion medium to obtain composite particles, and then forming an electrode active material layer using these composite particles.

CITATION LIST

Patent Literature

Patent Literature 1: JP 4219705 B2

SUMMARY OF INVENTION

Technical Problem

In Patent Literature 1, an electrode active material layer is formed by pressurizing the composite particles, but there is a case in which the electrode active material is destroyed when the pressure at the time of pressurization is too strong, and thus it is concerned that the high temperature storage characteristics of the electrochemical device to be obtained deteriorate.

An object of the present invention is to provide composite particles for an electrochemical device electrode which makes it possible to manufacture an electrochemical device exhibiting excellent high temperature storage characteristics.

As a result of intensive studies to solve the above problems, the present inventor has found out that the above object can be achieved by using a composite of a water-soluble polymer and crystalline cellulose, thereby completing the present invention.

That is, according to the present invention, there are provided:
(1) composite particles for an electrochemical device electrode including an electrode active material (A), a particulate binder resin (B), a water-soluble polymer (C), and a composite (D) of a water-soluble polymer (d') and crystalline cellulose (d");
(2) the composite particles for an electrochemical device electrode according to (1), wherein 0.1 to 10 parts by weight of the water-soluble polymer (C) are contained with respect to 100 parts by weight of the electrode active material (A), 0.1 to 2.0 parts by weight of the composite (D) are contained with respect to 100 parts by weight of the electrode active material (A), and a weight ratio (C)/(D) of the water-soluble polymer (C) to the composite (D) is 0.2 to 15;
(3) the composite particles for an electrochemical device electrode according to (1) or (2), wherein the composite (D) has a property of being dispersed in water;
(4) the composite particles for an electrochemical device electrode according to any one of (1) to (3), wherein the particulate binder resin (B) contains at least either of a conjugated diene-based polymer or an acrylate-based polymer;
(5) the composite particles for an electrochemical device electrode according to any one of (1) to (4), wherein a primary average particle size of the composite (D) is 10 μm or less;
(6) the composite particles for an electrochemical device electrode according to (1), wherein the composite (D) is crystalline cellulose (d") being surface-treated with a water-soluble polymer (d');
(7) the composite particles for an electrochemical device electrode according to any one of (1) to (6), further including an electroconductive agent (E); and (8) a method for manufacturing the composite particles for an electrochemical device electrode according to any one of (1) to (7), the method including a step of obtaining the composite (D) by the crystalline cellulose (d") being subjected to surface treatment with the water-soluble polymer (d'), a step of obtaining a slurry for composite particles by mixing the electrode active material (A), the particulate binder resin (B), the water-soluble polymer (C), and the composite (D), and a step of obtaining composite particles for an electrochemical device electrode by granulating the slurry for composite particles.

Advantageous Effects of Invention

According to the present invention, it is possible to provide composite particles for an electrochemical device electrode which makes it possible to manufacture an electrochemical device exhibiting excellent high temperature storage characteristics, and also it is possible to provide a method of manufacturing these composite particles for an electrochemical device electrode.

DESCRIPTION OF EMBODIMENTS

Hereinafter, composite particles for an electrochemical device electrode of the present invention will be described. The composite particles for an electrochemical device electrode (hereinafter, referred to as the "composite particles" in some cases) of the present invention contain an electrode active material (A), a particulate binder resin (B), a water-soluble polymer (C), and a composite (D) of a water-soluble polymer (d') and crystalline cellulose (d").

Note that, hereinafter, further, "positive electrode active material" means an electrode active material for a positive electrode and "negative electrode active material" means an electrode active material for a negative electrode. Further, "positive electrode active material layer" means an electrode active material layer provided to a positive electrode and "negative electrode active material layer" means an electrode active material layer provided to a negative electrode.

Electrode Active Material (A)

When the electrochemical device is a lithium ion secondary battery, as the positive electrode active material, an active material capable of doping and dedoping a lithium ion is used, and is roughly classified into that composed of an inorganic compound and that composed of an organic compound.

Examples of the positive electrode active material composed of an inorganic compound may include a transition metal oxide, a transition metal sulfide, and a lithium-containing composite metal oxide consisting of lithium and a transition metal. As the transition metal, Ti, V, Cr, Mn, Fe, Co, Ni, Cu, Mo, and the like are used.

Examples of the transition metal oxide may include $MnO$, $MnO_2$, $V_2O_5$, $V_6O_{13}$, $TiO_2$, $Cu_2V_2O_3$, amorphous $V_2O—P_2O_5$, $MoO_3$, $V_2O_5$, and $V_6O_{13}$, and among them, $MnO$, $V_2O_5$, $V_6O_{13}$, and $TiO_2$ are preferable from the viewpoint of cycle stability and capacity. Examples of the transition metal sulfide may include $TiS_2$, $TiS_3$, amorphous $MoS_2$, and $FeS$. Examples of the lithium-containing composite metal oxide may include a lithium-containing composite metal oxide having a layered structure, a lithium-containing composite metal oxide having a spinel structure, and a lithium-containing composite metal oxide having an olivine type structure.

Examples of the lithium-containing composite metal oxide having a layered structure may include lithium-containing cobalt oxide ($LiCoO_2$) (hereinafter, referred to as "LCO" in some cases), lithium-containing nickel oxide ($LiNiO_2$), a lithium composite oxide of Co—Ni—Mn, a lithium composite oxide of Ni—Mn—Al, and a lithium composite oxide of Ni—Co—Al. Examples of the lithium-containing composite metal oxide having a spinel structure may include lithium manganate ($LiMn_2O_4$) or Li [$Mn_{3/2}M_{1/2}$]$O_4$ obtained by substituting a portion of Mn in lithium manganate with a transition metal (here, M represents Cr, Fe, Co, Ni, Cu, or the like). Examples of the lithium-containing composite metal oxide having an olivine type structure may include an olivine type lithium phosphate compound represented by $Li_xMPO_4$ (in the formula, M represents at least one kind selected from Mn, Fe, Co, Ni, Cu, Mg, Zn, V, Ca, Sr, Ba, Ti, Al, Si, B, and Mo, and $0 \leq X \leq 2$).

As the organic compound, for example, it is also possible to use an electroconductive polymer such as polyacetylene or poly-p-phenylene. An iron-based oxide exhibiting poor electrical conductivity may be used as a positive electrode active material covered with a carbon material by allowing a carbon source substance to exist at the time of reduction firing. Further, these compounds may be those that are subjected to partial element-substitution. The positive electrode active material may be a mixture of the inorganic compound and the organic compound.

When the electrochemical device is a lithium ion capacitor, the positive electrode active material may be a material which can reversibly carry a lithium ion and an anion such as tetrafluoroborate. Specifically, an allotrope of carbon can be preferably used. An electrode active material for use in an electric double layer capacitor can be widely used. Specific examples of the allotrope of carbon include activated carbon, polyacene (PAS), a carbon whisker, a carbon nanotube, and graphite.

A volume average particle size of the positive electrode active material is appropriately selected in consideration of a balance with other constituents of the electrode for an electrochemical device, but is preferably 1 to 50 μm and more preferably 2 to 30 μm from the viewpoint of improving the properties of the electrochemical device such as load characteristics and cycle characteristics.

Further, when the electrochemical device is a lithium ion secondary battery, examples of the negative electrode active material may include substances capable of transferring electrons in the negative electrode of the electrochemical device. When the electrochemical device is a lithium ion secondary battery, as the negative electrode active material, usually, it is possible to use a substance which can occlude and release lithium.

Examples of the negative electrode active material preferably used for a lithium ion secondary battery may include a negative electrode active material formed of carbon. Examples of the negative electrode active material formed of carbon may include natural graphite, artificial graphite, and carbon black, and among them, graphite such as artificial graphite or natural graphite is preferable and natural graphite is particularly preferable.

Further, other examples of the negative electrode active material preferably used for a lithium ion secondary battery may include a negative electrode active material containing a metal. In particular, a negative electrode active material containing at least one kind selected from the group consisting of tin, silicon, germanium, and lead is preferable. The negative electrode active materials containing these elements can decrease the irreversible capacity.

Among the negative electrode active materials containing these metals, a negative electrode active material containing silicon is preferable. It is possible to increase the electric capacity of the lithium ion secondary battery by using the negative electrode active material containing silicon. Further, generally the negative electrode active material containing silicon greatly (for example, about 5-fold) expands and contracts in association with charge and discharge, but the composite particles of the present invention have a strength capable of withstanding the expansion and contraction of the negative electrode active material containing silicon. Consequently, in the negative electrode manufactured by using the composite particles of the present invention, it is possible to effectively suppress deterioration of battery performance due to expansion and contraction of the negative electrode active material containing silicon.

Examples of the negative electrode active material containing silicon may include a compound containing silicon (hereinafter, referred to as the "silicon-containing compound" in some cases) and metal silicon. A silicon-containing compound is a compound of silicon and other elements, and examples thereof may include SiO, $SiO_2$, $SiO_x$ ($0.01 \leq x < 2$), SiC, and SiOC. Among them, $SiO_x$, SiOC, and SiC are preferable, and $SiO_x$ and SiOC are more preferable from the viewpoint of battery lifespan, and $SiO_x$ is particularly preferable from the viewpoint of suppressing swelling of the negative electrode. Here, $SiO_x$ is a compound which can be formed of SiO and/or $SiO_2$, and metal silicon. This $SiO_x$ can be manufactured, for example, by cooling and precipitating a silicon monoxide gas generated by heating a mixture of $SiO_2$ and metal silicon.

Further, when a silicon-containing compound is used as the negative electrode active material, a blending amount of the silicon-containing compound in the negative electrode active material is preferably 1 to 50% by weight, more preferably 5 to 40% by weight, and particularly preferably 10 to 30% by weight. When the blending amount of the silicon-containing compound is too small, the capacity in the case of making a lithium ion secondary battery decreases. Further, when the blending amount of the silicon-containing compound is too large, the negative electrode swells. Further, as the negative electrode active material, one kind may be used alone, or two or more kinds may be used in combination in an arbitrary ratio.

The negative electrode active material is preferably adjusted to be particulate. Here, when a shape of the particles of the negative electrode active material is spherical, an electrode having a high density can be obtained when forming a negative electrode. Further, a volume average particle size of the negative electrode active material for a lithium ion secondary battery is preferably 0.1 to 100 μm, more preferably 0.5 to 50 μm, and still more preferably 0.8 to 20 μm. Moreover, a tap density of the negative electrode active material for a lithium ion secondary battery is not particularly limited, but is preferably 0.6 g/cm$^3$ or more.

Further, examples of the negative electrode active material preferably used when the electrochemical device is a lithium ion capacitor include the negative electrode active material formed of carbon.

Particulate Binder Resin (B)

The particulate binder resin (B) used in the present invention is not particularly limited as long as it is a substance capable of binding the electrode active materials described above to each other. The particulate binder resin (B) is preferably a dispersion type particulate binder resin having a property of being dispersed in a solvent. Examples of the dispersion type particulate binder resin may include a polymer compound such as a silicon-based polymer, a fluorine-containing polymer, a conjugated diene-based polymer, an acrylate-based polymer, polyimide, polyamide, and polyurethane. A fluorine-containing polymer, a conjugated diene-based polymer, and an acrylate-based polymer are preferable and a conjugated diene-based polymer and an acrylate-based polymer are more preferable from the viewpoint of favorable adhesive properties of the water-soluble polymer (C) and the composite (D). Each of these polymers may be used alone, or two or more kinds thereof may be mixed and used as the dispersion type particulate binder resin.

A fluorine-containing polymer is a polymer which contains a monomer unit containing a fluorine atom. Specific examples of the fluorine-containing polymer may include polytetrafluoroethylene, polyvinylidene fluoride, a tetrafluoroethylene-perfluoroalkyl vinyl ether copolymer, an ethylene-tetrafluoroethylene copolymer, an ethylene-chlorotrifluoroethylene copolymer, and a perfluoroethylene-propene copolymer.

A conjugated diene-based polymer is a homopolymer of a conjugated diene-based monomer or a copolymer obtained by polymerizing a monomer mixture containing a conjugated diene-based monomer, or a hydrogenated product thereof. As the conjugated diene-based monomer, it is preferable to use 1,3-butadiene, 2-methyl-1,3-butadiene, 2,3-dimethyl-1,3-butadiene, 2-chloro-1,3-butadiene, substituted linear chain conjugated pentadienes, or substituted and side chain-conjugated hexadienes, and it is more preferable to use 1,3-butadiene from the viewpoint of being able to improve the flexibility when being formed into an electrode and to form an electrode having a high resistance to cracking. Further, the monomer mixture may contain two or more kinds of these conjugated diene-based monomers.

When the conjugated diene-based polymer is a copolymer of the conjugated diene-based monomer described above with a monomer copolymerizable with this, examples of such a copolymerizable monomer may include an α,β-unsaturated nitrile compound or a vinyl compound having an acid component.

Specific examples of the conjugated diene-based polymer may include a conjugated diene-based monomer homopolymer such as polybutadiene or polyisoprene; a copolymer of an aromatic vinyl monomer and a conjugated diene-based monomer such as a styrene-butadiene copolymer (SBR) which may be carboxy-modified; a copolymer of a vinyl cyanide-based monomer and a conjugated diene-based monomer such as an acrylonitrile-butadiene copolymer (NBR); hydrogenated SBR, and hydrogenated NBR.

A ratio of the conjugated diene-based monomer unit in the conjugated diene-based polymer is preferably 20 to 60% by weight and more preferably 30 to 55% by weight. When the ratio of the conjugated diene-based monomer unit is too large, the resistance of the electrode to an electrolytic solution tends to be lowered in the case of manufacturing the electrode by using composite particles containing the particulate binder resin (B). When the ratio of the conjugated diene-based monomer unit is too small, sufficient adhesion properties between the composite particles and the current collector tend not to be obtained.

An acrylate-based polymer is a polymer containing a monomer unit derived from a compound [(meth)acrylic acid ester] represented by a general formula (1): $CH_2=CR^1-COOR^2$ (wherein, $R^1$ represents a hydrogen atom or a methyl group and $R^2$ represents an alkyl group or a cycloalkyl group. $R^2$ may further have an ether group, a hydroxyl group, a phosphate group, an amino group, a carboxyl group, a fluorine atom, or an epoxy group.), and specifically it is a homopolymer of a compound represented by the general formula (1) or a copolymer obtained by polymerizing a monomer mixture containing the compound represented by the general formula (1). Specific examples of the compound represented by the general formula (1) may include a (meth)acrylic acid alkyl ester such as methyl (meth)acrylate, ethyl (meth)acrylate, propyl (meth)acrylate, isopropyl (meth)acrylate, n-butyl (meth) acrylate, isobutyl (meth) acrylate, cyclohexyl (meth)acrylate, 2-ethylhexyl (meth)acrylate, isopentyl (meth)acrylate, isooctyl (meth) acrylate, isobornyl (meth)acrylate, isodecyl (meth)acrylate, lauryl (meth)acrylate, stearyl (meth)acrylate, or tridecyl (meth)acrylate; an ether group-containing (meth)acrylic acid ester such as butoxyethyl (meth)acrylate, ethoxy diethylene glycol (meth)acrylate, methoxy dipropylene glycol (meth) acrylate, methoxy polyethylene glycol (meth)acrylate, phenoxyethyl (meth)acrylate, or tetrahydrofurfuryl (meth)acrylate; a hydroxyl group-containing (meth) acrylic acid ester such as (meth) acrylic acid-2-hydroxyethyl, (meth) acrylic acid-2-hydroxypropyl, (meth) acrylic acid-2-hydroxy-3-phenoxypropyl, or 2-(meth)acryloyloxyethyl-2-hydroxyethyl phthalate; a carboxylic acid-containing (meth)acrylic acid ester such as 2-(meth)acryloyloxyethyl phthalate or 2-(meth)acryloyloxyethyl phthalate; a fluorine group-containing (meth)acrylic acid ester such as perfluorooctylethyl (meth)acrylate; a phosphate group-containing (meth)acrylic acid ester such as ethyl (meth)acrylate phosphate; an epoxy group-containing (meth)acrylic acid ester such as glycidyl (meth)acrylate; and an amino group-containing (meth) acrylic acid ester such as dimethylaminoethyl (meth)acrylate.

Note that, in the present specification, "(meth)acryl" means "acryl" and "methacryl". Further, "(meth)acryloyl" means "acryloyl" and "methacryloyl".

Each of these (meth)acrylic acid esters may be used alone, or two or more kinds thereof may be used in combination. Among them, a (meth)acrylic acid alkyl ester is preferable and methyl (meth)acrylate, ethyl (meth)acrylate, n-butyl (meth)acrylate, or a (meth)acrylic acid alkyl ester having 6 to 12 carbon atoms in the alkyl group are more preferable from the viewpoint of being able to decrease the swelling properties with the electrolytic solution and to improve the cycle characteristics.

Further, when the acrylate-based polymer is a copolymer of the compound represented by the general formula (1) and a monomer copolymerizable therewith, examples of the copolymerizable monomer include carboxylic acid esters containing two or more carbon-carbon double bonds, an aromatic vinyl-based monomer, an amide-based monomer, olefins, a diene-based monomer, vinyl ketones, a heterocyclic ring-containing vinyl compound, an α, β-unsaturated nitrile compound, and a vinyl compound containing an acid component.

Among the copolymerizable monomers, the aromatic vinyl-based monomer is preferably used from the viewpoint that high resistance to deformation and high strength can be obtained, and sufficient adhesion between the electrode active material layer and the current collector is obtained when an electrode is manufactured. Examples of the aromatic vinyl-based monomer may include styrene.

Note that, when a ratio of the aromatic vinyl-based monomer is too large, sufficient adhesion properties between the electrode active material layer and the current collector tend not to be obtained. Also, when the ratio of the aromatic vinyl-based monomer is too small, resistance to electrolytic solution tends to be lowered when an electrode is manufactured.

A ratio of the (meth)acrylic acid ester unit in the acrylate-based polymer is preferably 50 to 95% by weight and more preferably 60 to 90% by weight from the viewpoint of being able to improve the flexibility when being formed into an electrode and to form an electrode having a high resistance to cracking.

Examples of the α,β-unsaturated nitrile compound used for the polymer included in the particulate binder resin (B) include acrylonitrile, methacrylonitrile, α-chloro acrylonitrile, and α-bromo acrylonitrile. Each of these α, β-unsaturated nitrile compounds may be used alone, or two or more kinds thereof may be used in combination. Among them, acrylonitrile and methacrylonitrile are preferable, and acrylonitrile is more preferable.

A ratio of the α,β-unsaturated nitrile compound unit in the particulate binder resin (B) is preferably 0.1 to 40% by weight, more preferably 0.5 to 30% by weight, and still more preferably 1 to 20% by weight. When the particulate binder resin (B) includes the α,β-unsaturated nitrile compound unit, high resistance to deformation and high strength can be obtained when an electrode is manufactured. Further, when the particulate binder resin (B) includes the α,β-unsaturated nitrile compound unit, adhesion between the electrode active material layer including composite particles and the current collector can be sufficient.

Note that, when the ratio of the α,β-unsaturated nitrile compound unit is too large, sufficient adhesion properties between the electrode active material layer and the current collector tend not to be obtained. Further, when the ratio of the α,β-unsaturated nitrile compound unit is too small, the resistance to electrolytic solution tends to be lowered when an electrode is manufactured.

Examples of the vinyl compound containing an acid component include acrylic acid, methacrylic acid, itaconic acid, maleic acid, and fumaric acid. Each of these vinyl compounds containing an acid component may be used alone, or two or more kinds thereof may be used in combination. Among them, acrylic acid, methacrylic acid, and itaconic acid are preferable, and methacrylic acid and itaconic acid are more preferable. Itaconic acid is particularly preferable from the viewpoint of having a favorable adhesive strength.

A ratio of the vinyl compound unit having an acid component in the particulate binder resin (B) is preferably 0.5 to 10% by weight, more preferably 1 to 8% by weight, and still more preferably 2 to 7% by weight from the viewpoint of improving the stability in use for a slurry for composite particles.

Note that, when the ratio of the vinyl compound unit having an acid component is too large, the viscosity of the slurry for composite particles tends to increase and handling is difficult. Further, when the ratio of the vinyl compound unit having an acid component is too small, the stability of the slurry for composite particles tends to decrease.

Since the particulate binder resin (B) used in the present invention is particulate, the binding properties are favorable and it is possible to suppress reduction in capacity of the manufactured electrode and the deterioration thereof due to repeated charge and discharge. Examples of the particulate binder resin (B) may include binder resin particles in a state that the binder resin particles are dispersed in water, such as latex, and binder resin particles in a powder form obtained by drying such a dispersion.

An average particle size of the particulate binder resin (B) is preferably 0.001 to 100 μm, more preferably 10 to 1000 nm, and still more preferably 50 to 500 nm from the viewpoint of favorable strength and flexibility of the electrode to be obtained as well as favorable stability when being formed into a slurry for composite particles.

Further, a method for manufacturing the particulate binder resin (B) used in the present invention is not particularly limited, and it is possible to employ a known polymerization method such as an emulsion polymerization method, a suspension polymerization method, a dispersion polymerization method, or a solution polymerization method.

Among them, it is preferable to manufacture the particulate binder resin (B) by the emulsion polymerization method since it is easy to control the particle size of the particulate binder resin (B). Further, the particulate binder resin (B) used in the present invention may be particles having a core-shell structure obtained by polymerizing a mixture of two or more kinds of monomers in stages.

A blending amount of the particulate binder resin (B) in the composite particles for an electrochemical device electrode of the present invention is, on a dry weight basis, preferably 0.1 to 50 parts by weight, more preferably 0.5 to 20 parts by weight, and still more preferably 1 to 15 parts by weight with respect to 100 parts by weight of the electrode active material (A) from the viewpoint of favorable adhesive properties between the water-soluble polymer (C) and the composite (D).

Water-Soluble Polymer (C)

The water-soluble polymer (C) used in the present invention refers to a polymer which has an undissolved fraction of less than 10.0% by weight when 0.5 g of the polymer is dissolved in 100 g of pure water at 25° C.

Specific examples of the water-soluble polymer (C) may include cellulose-based polymers such as carboxymethyl cellulose, methyl cellulose, ethyl cellulose, and hydroxypropyl cellulose and ammonium salts or alkali metal salts thereof, an alginic acid ester such as alginic acid propylene glycol ester and an alginic acid salt such as sodium alginate, or a polymer, a sulfonic acid polymer, polyacrylic acid, and poly(meth)acrylic acid salt such as sodium poly (meth) acrylates, polyvinyl alcohol, modified polyvinyl alcohol, poly-N-vinylacetamide, polyethylene oxide, polyvinylpyrrolidone, polycarboxylic acid, oxidized starch, starch phosphate, casein, various kinds of modified starch, chitin, and a chitosan derivative. Note that, in the present invention, "(modified) poly" means "unmodified poly" or "modified poly".

These water-soluble polymers (C) may be used alone, or two or more kinds thereof may be used in combination. Among them, a cellulose-based polymer, polyacrylic acid, polyvinyl alcohol, and poly-N-vinylacetamide are preferable, carboxymethyl cellulose or an ammonium salt or alkali metal salt thereof is particularly preferable among the cellulose-based polymers from the viewpoint of favorable dispersibility of the composite (D) and high adhesive properties.

A blending amount of the water-soluble polymer (C) in the composite particles is not particularly limited as long as in a range of not damaging an effect of the present invention, but is preferably 0.1 to 10 parts by weight, more preferably 0.2 to 5 parts by weight, still more preferably 0.25 to 5 parts by weight, and particularly preferably 0.3 to 2 parts by weight, in terms of solid content, with respect to 100 parts by weight of the electrode active material (A).

Composite (D)

The composite (D) used in the present invention is a composite of a water-soluble polymer (d') and crystalline cellulose (d").

The water-soluble polymer (d') used in the present invention refers to a polymer which has an undissolved fraction of less than 10.0% by weight when 0.5 g of the polymer is dissolved in 100 g of pure water at 25° C. Specific examples of the water-soluble polymer (d') may include cellulose-based polymers such as carboxymethyl cellulose, methyl cellulose, ethyl cellulose, and hydroxypropyl cellulose and ammonium salts or alkali metal salts thereof, an alginic acid ester such as alginic acid propylene glycol ester, an alginic acid salt such as sodium alginate, and a polymer, a polysaccharide-based polymer such as dextrin, carrageenan, or xanthan gum, a sulfonic acid-based polymer, polyacrylic acid, a poly(meth)acrylic acid salt such as sodium poly (meth)acrylate, polyvinyl alcohol, modified polyvinyl alcohol, poly-N-vinylacetamide, polyethylene oxide, polyvinylpyrrolidone, polycarboxylic acid, oxidized starch, starch phosphate, casein, various kinds of modified starch, chitin, and a chitosan derivative. Note that, in the present invention, "(modified) poly" means "unmodified poly" or "modified poly".

These water-soluble polymers (d') may be used alone, or two or more kinds thereof may be used in combination. Among them, a cellulose-based polymer and a polysaccharide-based polymer are preferable from the viewpoint of a high reinforcing effect by the crystalline cellulose (d") and of improving the strength of the composite particles, among the cellulose-based polymers, carboxymethyl cellulose or an ammonium salt or alkali metal salt thereof is particularly preferable, and among the polysaccharide-based polymers, dextrin, xanthan gum, and carrageenan are particularly preferable.

Further, the crystalline cellulose (d") used in the present invention is obtained by subjecting a cellulose material such as pulp fibers of plants or purified linters to a depolymerization treatment such as acid hydrolysis, alkaline hydrolysis, or enzymatic decomposition. The depolymerization treatment makes it possible to extract the crystalline region of the cellulose material, and the crystallinity of the crystalline cellulose (d") is preferably 10% or more, more preferably 30% or more, and still more preferably 50% or more. Note that, the crystallinity is one that is calculated from the diffraction intensity value of the X-ray diffraction pattern obtained by an X-ray diffraction apparatus regulated in JIS K 0131-1996 ("X-ray diffraction analysis general rules") by the Segal method and it is defined by the following equation.

$$\text{Crystallinity (\%)} = [(Ic-Ia)/Ic] \times 100$$

(Here, Ic: diffraction intensity at diffraction angle 2θ=22.5 degrees on the X-ray diffraction pattern, Ia: baseline intensity (minimum value intensity) in the vicinity of diffraction angle 2θ=18.5 degrees on the same X-ray diffraction pattern)

Further, the average polymerization degree of crystalline cellulose (d") is preferably 30 to 400.

The crystalline cellulose (d") used in the present invention is poorly soluble in water. Specifically, the undissolved fraction is 90% by weight or more, preferably 95% by weight or more, and still more preferably 99% by weight or more when 0.5 g of the crystalline cellulose (d") is dissolved in 100 g of pure water at 25° C.

The composite (D) of the water-soluble polymers (d') and the crystalline cellulose (d") is obtained, for example, by wet mixing, grinding, and dry-crushing the water-soluble polymers (d') and the crystalline cellulose (d"). This makes it possible to obtain the crystalline cellulose (d") being surface-treated with the water-soluble polymers (d') as the composite (D). That is, it is possible to use the water-soluble polymers (d') as a surface treatment agent for the crystalline cellulose (d").

Here, the crystalline cellulose (d") is usually precipitated in water. However, when the composite (D) being surface-treated with the water-soluble polymers (d') is stirred in water, the composite (D) has a property that the water-soluble polymers (d') is swelled and dissolved so that the crystalline cellulose (d") is dispersed in water in the form of colloid.

That is, the composite (D) in the present invention refers to one that has an average particle size (average primary particle size) of 20 μm or less and preferably 10 μm or less after the composite (D) is added into pure water and dispersed by thoroughly stirring (for example, for 5 minutes at 15000 rpm) by a stirrer such as a homogenizer and is not obviously precipitated in the case of allowing this dispersion to stand for 10 minutes or longer and preferably 30 minutes or longer. Note that, the average particle size in the present invention is a volume average particle size (d50) that is measured by a laser diffraction type particle size distribution measuring apparatus (for example, SALD-3100 manufactured by SHIMADZU CORPORATION) and calculated.

Note that, it is impossible to obtain the composite (D) having a property of being dispersed in water in the case of dry mixing and grinding the water-soluble polymers (d') and the crystalline cellulose (d"). That is, the average particle size of the composite obtained through dry mixing and grinding increases after the composite is added into pure water and thoroughly stirred by a stirrer such as a homogenizer or a clear precipitation is formed when this dispersion is allowed to stand.

A blending amount of the water-soluble polymer (d') in the composite (D) is not particularly limited as long as in a range of not damaging an effect of the present invention, but is preferably 0.5 to 50 parts by weight, more preferably 1 to 45 parts by weight, and still more preferably 1.5 to 40 parts by weight, in terms of solid content, with respect to 100 parts by weight of the composite (D). Further, a blending amount of the crystalline cellulose (d") in the composite (D) is preferably 50 to 99.5 parts by weight, more preferably 55 to 99 parts by weight, and still more preferably 60 to 98.5 parts by weight, in terms of solid content, with respect to 100 parts by weight of the composite (D).

When the blending amount of the water-soluble polymer (d') in the composite (D) is too small, the dispersion stability of the electrode active material in the slurry for composite particles used to manufacture the composite particles tends to deteriorate. Further, when the blending amount of the water-soluble polymer (d') in the composite (D) is too large, the strength of the composite particles to be obtained decreases.

As the composite (D), it is possible to use a commercially available product such as CEOLUS RC-591 (manufactured by Asahi Kasei Chemicals Corp.), CEOLUS RC-N-30 (manufactured by Asahi Kasei Chemicals Corp.), Neocel NEO-C91 (manufactured by MINGTAI CHEMICAL CO., LTD.), Avicel CL611 (manufactured by FMC), or Avicel BV1518 (manufactured by FMC), and among them, CEOLUS RC-591 (manufactured by Asahi Kasei Chemicals Corp.) and CEOLUS RC-N-30 (manufactured by Asahi Kasei Chemicals Corp.) are preferably used.

A blending amount of the composite (D) in the composite particles is not particularly limited as long as in a range of not damaging an effect of the present invention, but is preferably 0.1 to 2.0 parts by weight, more preferably 0.2 to 1.5 parts by weight, and still more preferably 0.3 to 1.0 part by weight, in terms of solid content, with respect to 100 parts by weight of the electrode active material (A). When the blending amount of the composite (D) in the composite particles is too small, the reinforcing effect decreases and the cycle characteristics of the electrochemical device to be obtained deteriorate. Further, when the blending amount of the composite (D) in the composite particles is too large, it is difficult to granulate the composite particles.

Further, the weight ratio (C)/(D) of the water-soluble polymer (C) to the composite (D) in the composite particles is preferably 0.2 to 15, more preferably 0.25 to 10, still more preferably 0.3 to 9.0, and particularly preferably 0.35 to 8.0, in terms of solid content, from the viewpoint that dispersibility of the composite (D) is improved. When the weight ratio (C)/(D) is too large, the reinforcing effect decreases and the cycle characteristics of the electrochemical device to be obtained deteriorate. Further, when the weight ratio (C)/(D) is too small, the storage stability of the slurry for composite particles decreases.

Electroconductive agent (E) The composite particles for an electrochemical device electrode of the present invention may contain an electroconductive agent (E) as necessary in addition to the components described above. Further, when the electrode active material (A) is a positive electrode active material, it is preferable to contain the electroconductive agent (E). The electroconductive agent (E) is not particularly limited as long as it is a material exhibiting electroconductivity, but a particulate material exhibiting electroconductivity is preferable, and examples thereof may include carbon black such as furnace black, acetylene black, and Ketjen black; graphite such as natural graphite and artificial graphite; carbon fibers such as polyacrylonitrile-based carbon fibers, pitch-based carbon fibers, and vapor-grown carbon fibers. An average particle size of the electroconductive agent (E) is not particularly limited when the electroconductive agent (E) is a particulate material, but is preferably smaller than an average particle size of the electrode active material, and is preferably 0.001 to 10 μm, more preferably 0.05 to 5 μm, and still more preferably 0.1 to 1 μm from the viewpoint of exhibiting sufficient electroconductivity with smaller use amount.

A blending amount of the electroconductive agent (E) in the composite particles for an electrochemical device electrode of the present invention is preferably 0.1 to 50 parts by weight, more preferably 0.5 to 15 parts by weight, and still more preferably 1 to 10 parts by weight with respect to 100 parts by weight of the electrode active material (A) from the viewpoint of sufficiently lowering the internal resistance while maintaining the capacity of the electrochemical device to be obtained high.

Manufacture of Composite Particles

The composite particles are obtained by granulating using the electrode active material (A), the particulate binder resin (B), the water-soluble polymer (C), the composite (D), and other components such as the electroconductive agent (E) added as necessary. The composite particles contain the electrode active material (A), the particulate binder resin (B), the water-soluble polymer (C), and the composite (D), but each of the electrode active material (A), the particulate binder resin (B), the water-soluble polymer (C), and the composite (D) does not exist as individually independent particles but one particle is formed of at least two or more components among the electrode active material (A), the particulate binder resin (B), the water-soluble polymer (C), and the composite (D) as the constituting components. Specifically, a plurality of individual particles of the two or more components form secondary particles through bonding in a state of substantially maintaining the shapes thereof, and for example, one in which a plurality (preferably several to several tens) of the electrode active materials (A) form a particulate by being bound by the particulate binder resin (B) is preferable.

A shape of the composite particle is preferably substantially spherical from the viewpoint of fluidity. That is, when a minor axis diameter of the composite particle is $L_s$, a major axis diameter thereof is $L_1$, $(L_a=(L_s+L_1)/2)$, and a value of $(1-(L_1-L_s)/L_s) \times 100$ is used as sphericity (%), the sphericity is preferably 80% or more, and more preferably 90% or more. Here, the minor axis diameter $L_s$ and the major axis diameter Li are measured with a scanning electron microscope photographic image.

An average particle size of the composite particles is preferably 0.1 to 200 μm, more preferably 1 to 150 μm, and still more preferably 10 to 80 μm from the viewpoint of being able to easily obtain the electrode layer having a desired thickness. Note that, the average particle size in the present invention is a volume average particle size that is measured by a laser diffraction type particle size distribution measuring apparatus (for example, SALD-3100 manufactured by SHIMADZU CORPORATION) and calculated.

A method for manufacturing the composite particles is not particularly limited, the composite particles can be obtained by manufacturing methods such as a spray drying granulation method, a rolling bed granulation method, a compression type granulation method, an agitation type granulation method, an extrusion granulation method, a crushing type granulation method, a fluidized bed granulation method, a fluidized bed multifunctional granulation method, and a melt granulation method.

As the method for manufacturing the composite particles, an optimum method may be appropriately selected depending on the components of the composite particles and the like from the viewpoint of easiness of controlling a particle size, productivity, easiness of controlling a particle size distribution, and the like. However, the spray drying granulation method described below is preferable because the composite particles can be relatively easily manufactured. Hereinafter, the spray drying granulation method will be described.

First, a slurry for composite particles (hereinafter, referred to as "slurry" in some cases) which contains the electrode active material (A), the particulate binder resin (B), the water-soluble polymer (C), and the composite (D) is prepared. The slurry for composite particles can be prepared by dispersing or dissolving the electrode active material (A), the particulate binder resin (B), the water-soluble polymer (C), the composite (D), and the electroconductive agent (E) added as necessary in a solvent. Note that, in this case, when the particulate binder resin (B) is dispersed in water as a solvent, the particulate binder resin (B) can be added in a state of being dispersed in water.

As the solvent used to obtain the slurry for composite particles, it is preferable to use water, but a mixed solvent of water with an organic solvent may be used or only organic solvents may be used alone or several kinds thereof may be used in combination. Examples of the organic solvent which can be used in this case may include alcohols such as methyl alcohol, ethyl alcohol, or propyl alcohol; alkyl ketones such as acetone or methyl ethyl ketone; ethers such as tetrahydrofuran, dioxane, or diglyme; and amides such as diethylformamide, dimethylacetamide, N-methyl-2-pyrrolidone, or dimethylimidazolidinone. When an organic solvent is used, alcohols are preferable. It is possible to increase the drying speed at the time of spray drying by using water and an organic solvent having a boiling point lower than that of water together. Further, this makes it possible to adjust the viscosity or fluidity of the slurry for composite particles and to improve the production efficiency.

Further, a viscosity of the slurry for composite particles is preferably 10 to 3,000 mPa·s, more preferably 30 to 1,500 mPa·s, and still more preferably 50 to 1,000 mPa·s at room temperature from the viewpoint of improving the productivity when granulating the composite particles by spray drying.

Further, in the present invention, when preparing the slurry for composite particles, a dispersing agent or a surfactant may be added as necessary. Examples of the surfactant may include an anionic surfactant, a cationic surfactant, a nonionic surfactant, and an amphoteric surfactant such as an anion-nonionic surfactant, but the anionic surfactant or the nonionic surfactant is preferable. A blending amount of the surfactant is preferably 50 parts by weight or less, more preferably 0.1 to 10 parts by weight, and still more preferably 0.5 to 5 parts by weight with respect to 100 parts by weight of the electrode active material (A).

An amount of the solvent to be used in preparing the slurry is preferably 1 to 70% by weight, more preferably 5 to 70% by weight, and still more preferably 10 to 65% by weight, in a solid content concentration of the slurry, from the viewpoint of uniformly dispersing the binder resin in the slurry.

A method or order for dispersing or dissolving the electrode active material (A), the particulate binder resin (B), the water-soluble polymer (C), the composite (D), and the electroconductive agent (E) added as necessary in a solvent is not particularly limited, and examples thereof may include a method of adding the electrode active material (A), the particulate binder resin (B), the water-soluble polymer (C), the composite (D), and the electroconductive agent (E) to a solvent and mixing together, a method of dissolving the water-soluble polymer (C) in a solvent, then adding the electrode active material (A), the electroconductive agent (E), and the composite (D) thereto and mixing together, and finally adding the particulate binder resin (B) dispersed in a solvent (for example, latex) thereto and mixing together, and a method of adding the electrode active material (A) and the electroconductive agent (E) to the particulate binder resin (B) and the composite (D) which are dispersed in a solvent and mixing together, and adding the water-soluble polymer (C) dissolved in a solvent to this mixture and mixing together.

Further, as a mixing apparatus, for example, it is possible to use a ball mill, a sand mill, a bead mill, a pigment dispersing machine, a grinding machine, an ultrasonic dispersing machine, a homogenizer, a homomixer, or a planetary mixer. Mixing is preferably performed at room temperature to 80° C. for ten minutes to several hours.

Subsequently, the obtained slurry for composite particles is subjected to spray drying and granulated. Spray drying is a method of spraying the slurry into hot air and drying it. Examples of an apparatus used for spraying the slurry include an atomizer. As the atomizer, two types of apparatuses, that is, a rotary disk method and a nozzle method are exemplified. In the rotary disc method, the slurry is introduced into approximately the center of the disk to be rotated at high speed, the slurry is emitted outside the disk by a centrifugal force of the disk, and the slurry is sprayed at that time. In the rotary disk method, the rotational speed of the disk depends on the size of the disc, but is preferably 5,000 to 30,000 rpm and more preferably 15,000 to 30,000 rpm. As the rotational speed of the disk is decreased, spray droplets become larger and the average particle size of the resulting composite particles becomes larger. Examples of the atomizer of the rotary disk method include a pin type and a vane type, but the pin type atomizer is preferable. The pin type atomizer is a kind of centrifugal spraying apparatus using a spray disc. The spray disc includes a plurality of spray rollers, disposed between upper and lower mounting discs detachably and substantially concentrically along peripheries thereof. The slurry for composite particles is introduced from the center of the spray disc, is attached to the spray rollers by a centrifugal force, moves on the surfaces of the rollers to the outside, and is finally separated from the surfaces of the rollers to be sprayed. On the other hand, in the nozzle method, the slurry for composite particles is pressurized, sprayed from a nozzle, and dried or the slurry ejected from the nozzle is atomized by the pressure of the air and dried.

The temperature of the slurry for composite particles to be sprayed is preferably room temperature, but may be a temperature higher than room temperature by heating. Further, the hot air temperature during spray drying is preferably 25 to 250° C., more preferably 50 to 200° C., and still more preferably 80 to 150° C. In the spray drying method, a method for blowing the hot air is not particularly limited. Examples thereof include a method in which the hot air flows in parallel with a spray direction in a transverse direction, a method in which the slurry is sprayed in a drying tower apex and go down along with the hot air, a method in which the sprayed droplets and the hot air are subjected to counterflow contact, and a method in which the sprayed droplets first flow in parallel with the hot air, then fall by gravity, and are subjected to counterflow contact with the hot air.

Electrochemical Device Electrode

The electrochemical device electrode of the present invention is an electrode obtained by laminating an electrode active material layer including the composite particles on a current collector. As a material of the current collector, for example, metal, carbon, or an electroconductive polymer can be used, and metal is preferably used. As metal, generally, copper, aluminum, platinum, nickel, tantalum, titanium, stainless steel, an alloy, or the like is used. Among them, copper, aluminum, or an aluminum alloy is preferably used from the viewpoint of electroconductivity and voltage resistance. Further, when high voltage resistance is required, high-purity aluminum disclosed in JP 2001-176757 A or the like can be preferably used. The current collector is a film or a sheet. The thickness thereof is appropriately selected depending on the intended use, but is preferably 1 to 200 µm, more preferably 5 to 100 µm, and more preferably 10 to 50 µm.

When the electrode active material layer is laminated on the current collector, the composite particles may be molded into a sheet, and then the sheet may be laminated on the current collector. However, the composite particles are preferably directly subjected to pressure molding on the current collector. Examples of the pressure molding method are as follows. That is, in a roll pressure molding method, using a roll-type pressure molding apparatus including a pair of rolls, while the current collector is sent with the rolls, the composite particles are supplied to the roll-type pressure molding apparatus with a supplying apparatus such as a screw feeder, and the electrode active material layer is thereby molded on the current collector. In another method, the composite particles are sprayed on the current collector, leveled with a blade or the like to adjust the thickness, and then subjected to molding with a pressure apparatus. In still another method, a mold is filled with the composite particles, and the mold is pressurized for molding. Among them, the roll pressure molding method is preferable. Particularly, the composite particles of the present invention have high fluidity, so that the high fluidity makes molding by roll pressure molding possible. This enables improvement of productivity.

The roll temperature during the roll pressure molding is preferably 25 to 200° C., more preferably 50 to 150° C., and still more preferably 80 to 120° C. from the viewpoint of being able to obtain sufficient adhesion between the electrode active material layer and the current collector. Further, press linear pressure between the rolls during the roll pressure molding is preferably 10 to 1000 kN/m, more preferably 200 to 900 kN/m, and still more preferably from 300 to 600 kN/m from the viewpoint of preventing the destruction of the electrode active material (A). Further, a molding speed during the roll pressure molding is preferably 0.1 to 20 m/min, and more preferably 4 to 10 m/min.

Further, post-pressure may be further applied as necessary in order to eliminate variations in the thickness of the molded electrochemical device electrode, and to achieve a high capacity by increasing the density of the electrode active material layer. A method of the post-pressure is preferably applied in a press step with a roll.

In the roll press step, two cylindrical rolls are vertically arranged in parallel at narrow intervals, and are rotated in opposite directions to each other. An electrode is pinched between the rolls to be pressurized. At this time, the rolls may be subjected to temperature adjustment such as heating or cooling, as necessary.

The density of the electrode active material layer is not particularly limited, but is generally 0.30 to 10 $g/cm^3$, preferably 0.35 to 8.0 $g/cm^3$, and more preferably 0.40 to 6.0 $g/cm^3$. Further, the thickness of the electrode active material layer is not particularly limited, but is generally 5 to 1000 µm, preferably 20 to 500 µm, and more preferably 30 to 300 µm.

Electrochemical Device

It is possible to obtain an electrochemical device by using the electrochemical device electrode obtained as described above at least as either of the positive electrode or the negative electrode and by further equipping a separator and an electrolytic solution. Examples of the electrochemical device may include a lithium ion secondary battery and a lithium ion capacitor.

Separator

As the separator, a microporous film or non-woven fabric including a polyolefin resin such as polyethylene or polypropylene, or an aromatic polyamide resin; a porous resin coating including inorganic ceramic powder; or the like can be used. Specific examples thereof include a microporous film formed of a resin such as a polyolefin-based (polyethylene, polypropylene, polybutene, polyvinyl chloride), a mixture thereof, or a copolymer thereof; a microporous film formed of a resin such as polyethylene terephthalate, polycycloolefin, polyether sulfone, polyamide, polyimide, polyimide amide, polyaramide, nylon, or polytetrafluoroethylene; woven polyolefin-based fibers or non-woven fabric of the polyolefin-based fibers; and aggregates of insulating material particles. Among them, the microporous film formed of a polyolefin-based resin is preferable because it is possible to reduce the thickness of the entire separator, and to increase the capacity per volume by increasing the active material ratio in the lithium ion secondary battery.

The thickness of the separator is preferably 0.5 to 40 μm, more preferably 1 to 30 μm, and still more preferably 1 to 25 μm from the viewpoint of being able to reduce the internal resistance due to the separator in the lithium ion secondary battery, and of excellent workability in manufacturing the lithium ion secondary battery.

Electrolytic Solution

As an electrolytic solution for a lithium ion secondary battery, for example, a non-aqueous electrolytic solution prepared by dissolving a supporting electrolyte in a non-aqueous solvent is used. As the supporting electrolyte, a lithium salt is preferably used. Examples of the lithium salt include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among them, $LiPF_6$, $LiClO_4$, and $CF_3SO_3Li$ which are easily dissolved in a solvent and exhibiting a high degree of dissociation are preferable. One kind of these lithium salts may be used alone, or two or more kinds thereof may be used in combination at an arbitrary ratio. The higher the degree of dissociation of the supporting electrolyte to be used is, the higher the lithium ion conductivity is, so that, it is possible to control the lithium ion conductivity depending on the kind of the supporting electrolyte.

The concentration of the supporting electrolyte in the electrolytic solution is preferably 0.5 to 2.5 mol/L depending on the type of the supporting electrolyte. When the concentration of the supporting electrolyte is too low or too high, the ion conductivity may be decreased.

The non-aqueous solvent is not particularly limited as long as the supporting electrolyte can be dissolved in the non-aqueous solvent. Examples of the non-aqueous solvent include carbonates such as dimethyl carbonate (DMC), ethylene carbonate (EC), diethyl carbonate (DEC), propylene carbonate (PC), butylene carbonate (BC), or methylethyl carbonate (MEC); esters such as γ-butyrolactone or methyl formate; ethers such as 1,2-dimethoxyethane or tetrahydrofuran; sulfur-containing compounds such as sulfolane or dimethyl sulfoxide; and ionic liquid used also as the supporting electrolyte. Among them, the carbonates are preferable because they have a high dielectric constant and a wide stable potential region. One kind of the non-aqueous solvents may be used alone, or two or more kinds thereof may be used in combination at an arbitrary ratio. In general, the lower the viscosity of the non-aqueous solvent is, the higher the lithium ion conductivity is. The higher the dielectric constant is, the higher the solubility of the supporting electrolyte is. However, these are in a trade-off relationship, and therefore, the lithium ion conductivity is preferably controlled for use depending on a kind of the solvent and a mixing ratio. Furthermore, the whole or a part of hydrogen atoms in the non-aqueous solvent may be replaced by fluorine atoms, and the obtained solvent may be used as a part or as a whole.

Further, the electrolytic solution may include an additive. Examples of the additive include a carbonate-based compound such as vinylene carbonate (VC); a sulfur-containing compound such as ethylene sulfite (ES); and a fluorine-containing compound such as fluoroethylene carbonate (FEC).

One kind of the additives may be used alone, or two or more kinds thereof may be used in combination at an arbitrary ratio. Note that, as the electrolytic solution for a lithium ion capacitor, a similar electrolytic solution usable for the above-described lithium ion secondary battery can be used.

Method for Manufacturing Electrochemical Device

Specific examples of manufacturing an electrochemical device such as a lithium ion secondary battery or a lithium ion capacitor include a method as follows. That is, a positive electrode and a negative electrode are superposed via a separator, are wound or folded depending on a battery shape, and are put into a battery container. An electrolytic solution is injected into the battery container, and the opening thereof is sealed. In addition, as necessary, expanded metal; an over-current prevention device such as a fuse or a PTC device; a lead plate, or the like may be put thereinto to prevent an increase of pressure inside the battery, overcharge and overdischarge. A shape of the lithium ion secondary battery may be any of a coin type, a button type, a sheet type, a cylinder type, a square, and a flat type. A material of the battery container is only required to inhibit infiltration of moisture into the battery. The material is not particularly limited, and may be metal, a laminate made of aluminum, or the like.

According to the composite particles for an electrochemical device electrode of the present invention, it is possible to manufacture an electrochemical device exhibiting excellent high temperature storage characteristics. Further, it is possible to mold the electrode active material layer with a weak pressure and to prevent the destruction of the electrode active material in the case of molding the electrode active material layer by using the composite particles for an electrochemical device electrode of the present invention.

EXAMPLES

Hereinafter, the present invention will be specifically described by showing Examples. However, the present invention is not limited to the following Examples, and can be arbitrarily changed to be performed within a range not departing from the gist of the invention and a scope equivalent thereto. Note that, in the following description, "%" and "parts" representing an amount are based on a weight, unless otherwise indicated.

In Examples and Comparative Examples, the evaluation on the particle strength of the composite particles, charge and discharge cycle characteristics, and high temperature storage characteristics was performed as follows.

Particle Strength of Composite Particles

Composite particles obtained in Examples and Comparative Examples were subjected to a compression test using a micro-compression tester ("MCT-W500" manufactured by SHIMADZU CORPORATION). In the compression test, a load was applied toward the center of the composite particles at room temperature at a load application rate of 4.46 mN/sec, and compressive strength (MPa) was measured when the particles were deformed until the diameters of the composite particles were displaced by 40%. Note that, in this measurement, composite particles having a diameter of 40 to 60 μm were selected to be subjected to the compression test.

Further, the compression test was performed 10 times, and an average value thereof was used as compressive strength. The compressive strength was evaluated with the following criteria, and the results are shown in Table 1 and Table 2. Note that, it is shown that the larger the compressive strength is, the better the adhesion strength between the electrode active materials is, and the better the particle strength of the composite particles is.

A: Compressive strength of 1.00 MPa or more
B: Compressive strength of 0.90 MPa or more and less than 1.00 MPa
C: Compressive strength of 0.80 MPa or more and less than 0.90 MPa
D: Compressive strength of 0.70 MPa or more and less than 0.80 MPa
E: Compressive strength of less than 0.70 MPa Charge and Discharge Cycle Characteristics The laminate type lithium ion secondary batteries obtained in Examples and Comparative Examples were subjected to a charge and discharge cycle test. In the test, the lithium ion secondary batteries were charged at a constant current until 4.2 V by a constant-current constant-voltage charging method of 0.5 C at 60° C., then charged at a constant voltage, and then discharged at a constant current of 0.5 C until 3.0 V. The charge and discharge cycle test was performed up to 100 cycles, and a ratio of a discharge capacity in the 100th cycle with respect to an initial discharge capacity was used as a capacity retention rate. The capacity retention rate was evaluated with the following criteria, and the results are shown in Table 1 and Table 2. It is shown that the larger the capacity retention rate is, the less a decrease in the capacity due to repeated charge and discharge is.
A: Capacity retention rate of 90% or more
B: Capacity retention rate of 80% or more and less than 90%
C: Capacity retention rate of 75% or more and less than 80%
D: Capacity retention rate of 70% or more, less than 75%
E: Capacity retention rate of less than 70% or unevaluable High Temperature Storage Characteristics Lithium ion secondary batteries of a coin-type cell were made by using the lithium ion secondary battery electrodes manufactured in Examples and Comparative Examples, allowed to stand for 24 hours, and then subjected to a charge and discharge operation at a charge and discharge rate of 4.2 V and 0.1 C to measure the initial capacity C0. Furthermore, the battery was charged to 4.2 V and stored at 60° C. for 14 days, and then subjected to a charge and discharge operation at a charge and discharge rate of 4.2 V and 0.1 C to measure the capacity C1 after the high temperature storage. The high temperature storage characteristics were evaluated by the capacitance change rate represented by $\Delta C = C1/C0 \times 100 (\%)$, and the results are shown in Table 1 and Table 2. It indicates that high temperature storage characteristics are superior as this value is higher.
A: 85% or more
B: 70% or more and less than 85%
C: 60% or more and less than 70%
D: 50% or more and less than 60%
E: less than 50%

Example 1

(Manufacture of Particulate Binder Resin (B))

130 parts of ion-exchanged water was added to an SUS-made separable flask which was equipped with a stirrer, a reflux condenser, and a thermometer and had a volume of 1 L, further 0.8 part of ammonium persulfate as a polymerization initiator and 10 parts of ion-exchanged water were added thereto, and the flask was heated to 80° C.

Further, 76 parts of 2-ethylhexyl acrylate as a (meth) acrylic acid ester monomer, 20 parts of acrylonitrile as an α,β-unsaturated nitrile monomer, 4.0 parts of itaconic acid as an acidic functional group-containing monomer, 2.0 parts of sodium dodecylbenzenesulfonate as an emulsifier, and 377 parts of ion-exchanged water were added to a separate vessel equipped with a stirrer, and thoroughly stirred to prepare an emulsion.

The emulsion obtained above was continuously added to the separable flask over 3 hours. The mixture was further allowed to react for 2 hours, and then cooled to stop the reaction. 10% aqueous ammonia was added to this to adjust the pH to 7.5, thereby obtaining an aqueous dispersion of an acrylate-based polymer as the particulate binder resin (B). The polymerization conversion rate was 98%.

(Manufacture of Slurry for Composite Particles)

90.8 parts of $LiCoO_2$ (hereinafter, referred to as "LCO" in some cases) of the positive electrode active material as the electrode active material (A), 6 parts of acetylene black (hereinafter, referred to as "AB" in some cases) as the electroconductive agent (E), 1.5 parts of the acrylate-based polymer as the particulate binder resin (B) in terms of solid content, 0.7 part of carboxymethyl cellulose (hereinafter, referred to as "CMC" in some cases) ("BSH-12" manufactured by DKS Co., Ltd.) as the water-soluble polymer (C), and 1.0 part of CEOLUS RC-591 (kind of water-soluble polymer (d'): carboxymethyl cellulose sodium salt (hereinafter, referred to as "CMC-Na" in some cases), weight ratio of water-soluble polymer (d') to crystalline cellulose (d") =11:89, average particle size: 8 μm, manufactured by Asahi Kasei Chemicals Corp.) as the composite (D) in terms of solid content were mixed, and further ion-exchanged water was added thereto so as to have a solid content concentration of 60% and mixed together by a planetary mixer, thereby obtaining a slurry for composite particles. The weight ratio (C)/(D) of the water-soluble polymer (C) to the composite (D) was 0.7.

(Manufacture of Composite Particles)

The slurry for composite particle was subjected to spray drying granulation in a spray dryer (manufactured by OHKAWARA KAKOHKI CO., LTD.) at a rotational speed of 25,000 rpm, a hot air temperature of 150° C., and the temperature of the particle recovery exit of 90° C. by using the rotary disk type atomizer (diameter: 65 mm), thereby obtaining composite particles. The average volume particle size of these composite particles was 40 μm.

(Manufacture of Positive Electrode for Lithium Ion Secondary Battery)

The composite particles obtained above were supplied between the rolls for press (roll temperature: 100° C. and press linear pressure: 500 kN/m) of a roll press machine ("press-cutting rough surface heat roll" manufactured by HIRANO GIKENKOGYO Co., Ltd.) by using a constant feeder ("NIKKA SPRAYER K-V" manufactured by NIKKA LIMITED). An aluminum foil having a thickness of 20 μm was inserted between the rolls for press, the composite particles for a secondary battery electrode supplied through the constant feeder were stuck on the aluminum foil, and were subjected to pressure molding at a molding speed of 1.5 m/min, thereby obtaining a positive electrode having a positive electrode active material.

(Manufacture of Binder Resin for Negative Electrode)

47 parts of styrene, 50 parts of 1,3-butadiene, 3 parts of methacrylic acid, 4 parts of sodium dodecylbenzenesulfonate, 150 parts of ion-exchanged water, 0.4 part of t-dodecylmercaptan as a chain transfer agent, and 0.5 part of potassium persulfate as a polymerization initiator were put into a vessel that was resistant to a pressure of 5 MPa and equipped with a stirrer, thoroughly stirred, and then heated to 50° C. to initiate the polymerization. The reaction mixture was cooled to stop the reaction when the polymerization conversion rate reached 96%, thereby obtaining a particulate binder resin for a negative electrode (styrene-butadiene copolymer; hereinafter, abbreviated as "SBR" in some cases).

(Manufacture of Slurry Composition for Negative Electrode)

98.3 parts of artificial graphite (average particle size: 24.5 μm) having a specific surface area of 4 m$^2$/g as a negative electrode active material, 0.7 part of a 1% aqueous solution of carboxymethyl cellulose ("BSH-12" manufactured by DKS Co., Ltd.) as a dispersing agent in terms of solid content, 1.0 part of the binder resin for a negative electrode in terms of solid content were added to a planetary mixer equipped with a disper, the total solid content concentration thereof was adjusted to 50% with ion-exchanged water, and the components were mixed together. The resultant mixture was subjected to a defoaming treatment under reduced pressure, thereby obtaining a slurry composition for a negative electrode.

(Manufacture of Negative Electrode for Lithium Ion Secondary Battery)

The slurry composition for a negative electrode obtained above was applied onto a copper foil having a thickness of 20 μm so as to have a film thickness after drying of about 150 μm by using a comma coater and dried. The drying was conducted by transporting the copper foil in an oven at 60° C. over 2 minutes at a speed of 0.5 m/min. Thereafter, the copper foil was heated for 2 minutes at 120° C., thereby obtaining a negative electrode raw material. The negative electrode raw material was rolled by a roll press, thereby obtaining a negative electrode having a negative electrode active material layer.

(Preparation of Separator)

A single-layer separator made of polypropylene (width: 65 mm, length: 500 mm, thickness: 25 μm, manufactured by a dry method, and porosity: 55%) was cut into a square of 5×5 cm$^2$.

(Manufacture of Lithium Ion Secondary Battery)

As the exterior of the battery, an aluminum packaging material exterior was prepared. The positive electrode for a lithium ion secondary battery obtained above was cut into a square of 4×4 cm$^2$ and disposed such that a surface on a side of the current collector was in contact with the aluminum packaging material exterior. The square separator obtained above was disposed on a surface of the positive electrode active material layer of the positive electrode for a lithium ion secondary battery. Furthermore, the negative electrode for a lithium ion secondary battery obtained above was cut into a square of 4.2×4.2 cm$^2$ and disposed on the separator such that a surface on a side of the negative electrode active material layer faced the separator. Furthermore, a LiPF$_6$ solution containing 2.0% of vinylene carbonate and having a concentration of 1.0 M was poured thereinto. A solvent in this LiPF$_6$ solution was a mixed solvent of ethylene carbonate (EC) and ethylmethyl carbonate (EMC) (EC/EMC=3/7 (volume ratio)). In addition, in order to seal the opening of the aluminum packaging material, the aluminum exterior was closed by heat sealing at 150° C., thereby manufacturing a laminate type lithium ion secondary battery (laminate type cell).

Example 2

The manufacture of a slurry for composite particles, the manufacture of composite particles, the manufacture of a positive electrode, and the manufacture of a lithium ion secondary battery were conducted in the same manner as in Example 1 except that the electrode active material (A) used in the manufacture of a slurry for composite particles was 90.8 parts of LiNiO$_2$.

Example 3

The manufacture of a slurry for composite particles, the manufacture of composite particles, the manufacture of a positive electrode, and the manufacture of a lithium ion secondary battery were conducted in the same manner as in Example 1 except that the electrode active material (A) used in the manufacture of a slurry for composite particles was 90.8 parts of lithium nickel manganese cobalt oxide (NMC (111)) having a layered structure.

Example 4

The manufacture of a slurry for composite particles, the manufacture of composite particles, the manufacture of a positive electrode, and the manufacture of a lithium ion secondary battery were conducted in the same manner as in Example 1 except that RC-N-30 (kind of water-soluble polymer (d'): xanthan gum and dextrin, weight ratio of xanthan gum to dextrin to crystalline cellulose (d")=5:20:75, average particle size: 8 μm, manufactured by Asahi Kasei Chemicals Corp.) was used as the composite (D) in the manufacture of a slurry for composite particles.

Example 5

The manufacture of a slurry for composite particles, the manufacture of composite particles, the manufacture of a positive electrode, and the manufacture of a lithium ion secondary battery were conducted in the same manner as in Example 1 except that the amount of the water-soluble polymer (C) was 0.5 part in terms of solid content and the amount of the composite (D) was 1.2 parts, in the manufacture of a slurry for composite particles. The weight ratio (C)/(D) of the water-soluble polymer (C) to the composite (D) was 0.42.

Example 6

The manufacture of a slurry for composite particles, the manufacture of composite particles, the manufacture of a positive electrode, and the manufacture of a lithium ion secondary battery were conducted in the same manner as in Example 1 except that the amount of the electrode active material (A) was 91.6 parts, the amount of the water-soluble polymer (C) was 0.8 part in terms of solid content, and the amount of the composite (D) was 0.1 part, in the manufacture of a slurry for composite particles. The weight ratio (C)/(D) of the water-soluble polymer (C) to the composite (D) was 8.0.

Example 7

The manufacture of a slurry for composite particles, the manufacture of composite particles, the manufacture of a positive electrode, and the manufacture of a lithium ion secondary battery were conducted in the same manner as in Example 1 except that the water-soluble polymer (C) used in the manufacture of a slurry for composite particles was a polyacrylic resin. Note that, the manufacture of the polyacrylic resin was conducted as follows.

(Manufacture of Polyacrylic Resin)

Desalted water was introduced to an SUS-made separable flask in advance which was equipped with a stirrer, a reflux condenser, and a thermometer and had a volume of 1 L, thoroughly stirred, and then heated to 70° C., and 0.2 part of an aqueous solution of potassium persulfate was added thereto.

Further, 50 parts of ion-exchanged water, 0.4 part of sodium hydrogen carbonate, 0.115 part of dodecyl diphenyl ether sodium sulfonate at a concentration of 30% as an emulsifier, and a monomer mixture composed of 60 parts of methacrylic acid, 15 parts of ethyl acrylate, 15 parts of butyl acrylate, and 10 parts of 2-acrylamido-2-methylpropane-sulfonic acid as a sulfonic acid group-containing monomer copolymerizable with these were introduced into a separate vessel that was resistant to a pressure of 5 MPa and equipped with a stirrer, and thoroughly stirred, thereby preparing an aqueous emulsion solution.

The aqueous emulsion solution obtained above was continuously added to the separable flask dropwise over 4 hours. The reaction temperature was set to 80° C. when the polymerization conversion rate reached 90%, the reaction was further conducted for 2 hours, and the reaction mixture was then cooled to stop the reaction, thereby obtaining an aqueous dispersion containing a polyacrylic resin. Note that, the polymerization conversion rate was 99%. Further, the weight average molecular weight of the polyacrylic resin obtained above was measured by GPC, and the result was 25000. Further, the viscosity of a 1% by weight aqueous solution of the polyacrylic resin obtained above was 3000 (mPa·s).

Example 8

The manufacture of a slurry for composite particles, the manufacture of composite particles, the manufacture of a positive electrode, and the manufacture of a lithium ion secondary battery were conducted in the same manner as in Example 1 except that the water-soluble polymer (C) used in the manufacture of a slurry for composite particles was a poly-N-vinylacetamide (PNVA, GE191-103 manufactured by Showa Denko K.K.) resin.

Example 9

The manufacture of a slurry for composite particles, the manufacture of composite particles, the manufacture of a positive electrode, and the manufacture of a lithium ion secondary battery were conducted in the same manner as in Example 1 except that the water-soluble polymer (C) used in the manufacture of a slurry for composite particles was a polyvinyl alcohol resin (PVA, JF-17).

Comparative Example 1

The manufacture of a slurry for composite particles, the manufacture of composite particles, the manufacture of a positive electrode, and the manufacture of a lithium ion secondary battery were conducted in the same manner as in Example 1 except that the composite (D) was not added, the amount of the electrode active material (A) was 91.0 parts, and the amount of the water-soluble polymer (C) was 1.5 parts in the manufacture of a slurry for composite particles.

Comparative Example 2

The manufacture of a slurry for composite particles, the manufacture of composite particles, the manufacture of a positive electrode, and the manufacture of a lithium ion secondary battery were conducted in the same manner as in Example 1 except that the water-soluble polymer (C) was not added, the amount of the electrode active material (A) was 91.0 parts, and the amount of the composite (D) was 1.5 parts in the manufacture of a slurry for composite particles.

Comparative Example 3

The manufacture of a slurry for composite particles, the manufacture of composite particles, the manufacture of a positive electrode, and the manufacture of a lithium ion secondary battery were conducted in the same manner as in Example 1 except that the amount of the electrode active material (A) was 90.7 parts, the amount of the water-soluble polymer (C) was 0.8 part in terms of solid content, and 1.0 part of FD-F20 (average particle size: 20 μm, manufactured by Asahi Kasei Chemicals Corp.) was used as the crystalline cellulose (d") that was not subjected to the surface treatment instead of the composite (D), in the manufacture of a slurry for composite particles. The weight ratio (C)/(d") of the water-soluble polymer (C) to the crystalline cellulose (d") that was not subjected to the surface treatment was 0.8.

Example 10

(Manufacture of Particulate Binder Resin (B))

47 parts of styrene, 50 parts of 1,3-butadiene, 3 parts of methacrylic acid, 4 parts of sodium dodecylbenzene-sulfonate, 150 parts of ion-exchanged water, 0.4 part of t-dodecylmercaptan as a chain transfer agent, and 0.5 part of potassium persulfate as a polymerization initiator were put into a vessel that was resistant to a pressure of 5 MPa and equipped with a stirrer, thoroughly stirred, and then heated to 50° C. to initiate the polymerization. The reaction mixture was cooled to stop the reaction when the polymerization conversion rate was 96%, thereby obtaining a styrene-butadiene copolymer (hereinafter, referred to as "SBR" in some cases) as the particulate binder resin (B).

Manufacture of Slurry for Composite Particles 91.1 parts of artificial graphite (average particle size: 24.5 μm, graphite interlayer distance (interplanar spacing (d value) of (002) plane by X-ray diffraction method): 0.354 nm) and 6.6 parts of SiC of a negative electrode active material as the electrode active material (A), 1.4 parts of the SBR as the particulate binder resin (B) in terms of solid content, 0.3 part of a 1.0% aqueous solution ("BSH-12" manufactured by DKS Co., Ltd.) of carboxymethyl cellulose (hereinafter, abbreviated as "CMC" in some cases) as the water-soluble polymer (C) in terms of solid content, and 0.6 part of CEOLUS RC-591 (kind of water-soluble polymer (d'): carboxymethyl cellulose sodium salt (hereinafter, referred to as "CMC-Na" in some cases), weight ratio of water-soluble polymer (d') to crystalline cellulose (d")=11:89, average particle size: 8 μm, manufactured by Asahi Kasei Chemicals Corp.) as the composite (D) in terms of solid content were mixed, and further ion-exchanged water was added thereto so as to have a solid content concentration of 40%, and the components were mixed and dispersed, thereby obtaining a slurry for composite particles. The weight ratio (C)/(D) of the water-soluble polymer (C) to the composite (D) was 0.5.

(Manufacture of Composite Particles)

The slurry for composite particle was subjected to spray drying granulation in a spray dryer (manufactured by OHKAWARA KAKOHKI CO., LTD.) at a rotational speed of 25,000 rpm, a hot air temperature of 150° C., and the temperature of the particle recovery exit of 90° C. by using the rotary disk type atomizer (diameter: 65 mm), thereby obtaining composite particles. The average volume particle size of these composite particles was 40 μm.

(Manufacture of Negative Electrode for Lithium Ion Secondary Battery)

Subsequently, the obtained particles were supplied to a roll of a roll press machine ("press-cutting rough surface heat roll", manufactured by HIRANO GIKEN KOGYO Co., Ltd.) (roll temperature: 100° C., press linear pressure: 400 kN/m), and were molded into a sheet at a molding speed of 20 m/minute to obtain a negative electrode for a lithium ion secondary battery having a thickness of 80 μm.

(Manufacture of Slurry Composition for Positive Electrode and Positive Electrode for Lithium Ion Secondary Battery)

Polyvinylidene fluoride (PVDF; "KF-1100" manufactured by KUREHA CHEMICAL INDUSTRY CO., LTD.) as a positive electrode binder resin was added to 92 parts of $LiCoO_2$ (hereinafter, abbreviated as "LCO" in some cases) having a layered structure as the positive electrode active material such that the solid content of the binder resin became 2 parts, further 6 parts of acetylene black ("HS-100" manufactured by Denka Company Limited) and 20 parts of N-methylpyrrolidone were added thereto and mixed with a planetary mixer, thereby obtaining a slurry composition for a positive electrode. This slurry composition for a positive electrode was applied onto an aluminum foil having a thickness of 18 μm, dried at 120° C. for 30 minutes, and then roll pressed, thereby obtaining a positive electrode for a lithium ion secondary battery having a thickness of 60 μm.

(Preparation of Separator)

A single-layer separator made of polypropylene (width: 65 mm, length: 500 mm, thickness: 25 μm, manufactured by a dry method, and porosity: 55%) was cut into a square of 5×5

(Manufacture of Lithium Ion Secondary Battery)

As the exterior of the battery, an aluminum packaging material exterior was prepared. The positive electrode for a lithium ion secondary battery obtained above was cut into a square of 4×4 $cm^2$ and disposed such that a surface on a side of the current collector was in contact with the aluminum packaging material exterior. The square separator obtained above was disposed on a surface of the positive electrode active material layer of the positive electrode for a lithium ion secondary battery. Furthermore, the negative electrode for a lithium ion secondary battery obtained above was cut into a square of 4.2×4.2 $cm^2$ and disposed on the separator such that a surface on a side of the negative electrode active material layer faced the separator. Furthermore, a $LiPF_6$ solution containing 2.0% of vinylene carbonate and having a concentration of 1.0 M was poured thereinto. A solvent in this $LiPF_6$ solution was a mixed solvent of ethylene carbonate (EC) and ethylmethyl carbonate (EMC) (EC/EMC=3/7 (volume ratio)). In addition, in order to seal the opening of the aluminum packaging material, the aluminum exterior was closed by heat sealing at 150° C., thereby manufacturing a laminate type lithium ion secondary battery (laminate type cell).

Example 11

The manufacture of a slurry for composite particles, the manufacture of composite particles, the manufacture of a negative electrode for a lithium ion secondary battery, and the manufacture of a lithium ion secondary battery were conducted in the same manner as in Example 10 except that RC-N-30 (kind of water-soluble polymer (d'): xanthan gum and dextrin, weight ratio of xanthan gum to dextrin to crystalline cellulose (d")=5:20:75, average particle size: 8 μm, manufactured by Asahi Kasei Chemicals Corp.) was used as the composite (D).

Example 12

The manufacture of a slurry for composite particles, the manufacture of composite particles, the manufacture of a negative electrode for a lithium ion secondary battery, and the manufacture of a lithium ion secondary battery were conducted in the same manner as in Example 10 except that the amount of the electrode active material (A) was 91.0 parts of artificial graphite and 6.6 parts of SiC, the amount of the water-soluble polymer (C) was 0.2 part in terms of solid content, and the amount of the composite (D) was 0.8 part, in the manufacture of a slurry for composite particles. The weight ratio (C)/(D) of the water-soluble polymer (C) to the composite (D) was 0.25.

Example 13

The manufacture of a slurry for composite particles, the manufacture of composite particles, the manufacture of a negative electrode for a lithium ion secondary battery, and the manufacture of a lithium ion secondary battery were conducted in the same manner as in Example 10 except that the amount of the electrode active material (A) was 90.6 parts of artificial graphite and 6.6 parts of SiC, 1.3 parts of a 1.0% aqueous solution of CMC ("BSH-6" manufactured by DKS Co., Ltd.) in terms of solid content was used as the water-soluble polymer (C), and the amount of the composite (D) was 0.1 part in terms of solid content, in the manufacture of a slurry for composite particles. The weight ratio (C)/(D) of the water-soluble polymer (C) to the composite (D) was 13.0.

Example 14

The manufacture of a slurry for composite particles, the manufacture of composite particles, the manufacture of a negative electrode for a lithium ion secondary battery, and the manufacture of a lithium ion secondary battery were conducted in the same manner as in Example 10 except that the electrode active material (A) was 97.7 parts of artificial graphite and the kind of the particulate binder resin (B) was an acrylate-based polymer, in the manufacture of a slurry for composite particles. Note that, the acrylate-based polymer was the same as that used in Example 1.

Example 15

The manufacture of a slurry for composite particles, the manufacture of composite particles, the manufacture of a negative electrode for a lithium ion secondary battery, and the manufacture of a lithium ion secondary battery were conducted in the same manner as in Example 10 except that the electrode active material (A) was 97.6 parts of artificial graphite, the amount of the particulate binder resin (B) was 1.2 parts, the water-soluble polymer (C) was 0.4 part of a polyacrylic resin, and the amount of the composite (D) was 0.8 part, in the manufacture of a slurry for composite particles. The weight ratio (C)/(D) of the water-soluble polymer (C) to the composite (D) was 0.5. Note that, the polyacrylic resin was the same as that used in Example 7.

Example 16

The manufacture of a slurry for composite particles, the manufacture of composite particles, the manufacture of a negative electrode for a lithium ion secondary battery, and the manufacture of a lithium ion secondary battery were conducted in the same manner as in Example 15 except that a poly-N-vinylacetamide resin (PNVA, GE191-103 manufactured by Showa Denko K.K.) was used as the water-soluble polymer (C) used in the manufacture of a slurry for composite particles.

Example 17

The manufacture of a slurry for composite particles, the manufacture of composite particles, the manufacture of a negative electrode for a lithium ion secondary battery, and the manufacture of a lithium ion secondary battery were conducted in the same manner as in Example 15 except that a polyvinyl alcohol resin (PVA, JF-17) was used as the water-soluble polymer (C) used in the manufacture of a slurry for composite particles.

Comparative Example 4

The manufacture of a slurry for composite particles, the manufacture of composite particles, the manufacture of a negative electrode for a lithium ion secondary battery, and the manufacture of a lithium ion secondary battery were conducted in the same manner as in Example 10 except that the composite (D) was not added, the electrode active material (A) was 97.7 parts of artificial graphite, and the amount of the water-soluble polymer (C) was 0.9 part in terms of solid content in the manufacture of a slurry for composite particles.

Comparative Example 5

The manufacture of a slurry for composite particles, the manufacture of composite particles, the manufacture of a negative electrode for a lithium ion secondary battery, and the manufacture of a lithium ion secondary battery were conducted in the same manner as in Example 10 except that the water-soluble polymer (C) was not added, the electrode active material (A) was 97.7 parts of artificial graphite, and the amount of the composite (D) was 0.9 part in terms of solid content in the manufacture of a slurry for composite particles.

Comparative Example 6

The manufacture of a slurry for composite particles, the manufacture of composite particles, the manufacture of a negative electrode for a lithium ion secondary battery, and the manufacture of a lithium ion secondary battery were conducted in the same manner as in Example 10 except that the electrode active material (A) was 97.7 parts of artificial graphite, the amount of the water-soluble polymer (C) was 0.4 part in terms of solid content, and 0.6 part of FD-F20 (average particle size: 20 μm, manufactured by Asahi Kasei Chemicals Corp.) was used as the crystalline cellulose (d″) that was not subjected to the surface treatment instead of the composite (D), in the manufacture of a slurry for composite particles. The weight ratio (C)/(d″) of the water-soluble polymer (C) to the crystalline cellulose (d″) that was not subjected to the surface treatment was 0.67.

TABLE 1

| | | | Ex. 1 | Ex. 2 | Ex. 3 | Ex. 4 | Ex. 5 | Ex. 6 |
|---|---|---|---|---|---|---|---|---|
| Composition of composite particles | Electrode active material (A) | Kind | LCO | $LiNiO_2$ | NMC | LCO | LCO | LCO |
| | | Amount (parts) | 90.8 | 90.8 | 90.8 | 90.8 | 90.8 | 91.6 |
| | Electroconductive agent (E) | Kind | AB | AB | AB | AB | AB | AB |
| | | Amount (parts) | 6 | 6 | 6 | 6 | 6 | 6 |
| | Particulate binder resin (B) | Kind | Acrylate-based polymer | Acrylate-based polymer | Acrylate-based polymer | Acrylate-based polymer | Acrylate-based polymer | Acrylate-based polymer |
| | | Amount (parts) | 1.5 | 1.5 | 1.5 | 1.5 | 1.5 | 1.5 |
| | Water-soluble polymer (C) | Kind | CMC (BSH-12) | CMC (BSH-12) | CMC (BSH-12) | CMC (BSH-12) | CMC (BSH-12) | CMC (BSH-12) |
| | | Amount (parts) | 0.7 | 0.7 | 0.7 | 0.7 | 0.5 | 0.8 |
| | Composite (D) | Kind | CEOLUS RC-591, Asahi Kasei Chemicals Corp. (CMC-Na: 11, crystalline cellulose: 89) | CEOLUS RC-591, Asahi Kasei Chemicals Corp. (CMC-Na: 11, crystalline cellulose: 89) | CEOLUS RC-591, Asahi Kasei Chemicals Corp. (CMC-Na: 11, crystalline cellulose: 89) | CEOLUS RC-N-30, Asahi Kasei Chemicals Corp. (xanthan gum: 5, dextrin: 20, crystalline cellulose: 75) | CEOLUS RC-591, Asahi Kasei Chemicals Corp. (CMC-Na: 11, crystalline cellulose: 89) | CEOLUS RC-591, Asahi Kasei Chemicals Corp. (CMC-Na: 11, crystalline cellulose: 89) |
| | | Amount (parts) | 1.0 | 1.0 | 1.0 | 1.0 | 1.2 | 0.1 |
| | | Average particle size (μm) | 8 | 8 | 8 | 8 | 8 | 8 |
| | Value of weight ratio (C)/(D) | | 0.7 | 0.7 | 0.7 | 0.7 | 0.42 | 8.0 |
| Evaluation items | Particle strength of composite particles | | A | A | A | A | A | A |
| | Charge and discharge cycle characteristics | | A | A | A | A | A | B |
| | High temperature storage | | A | A | A | B | B | B |

TABLE 1-continued

| | | characteristics | | | | | | |
|---|---|---|---|---|---|---|---|---|
| | | | Ex. 7 | Ex. 8 | Ex. 9 | Comp. Ex. 1 | Comp. Ex. 2 | Comp. Ex. 3 |
| Composition of composite particles | Electrode active material (A) | Kind | LCO | LCO | LCO | LCO | LCO | LCO |
| | | Amount (parts) | 90.8 | 90.8 | 90.8 | 91.0 | 91.0 | 90.7 |
| | Electroconductive agent (E) | Kind | AB | AB | AB | AB | AB | AB |
| | | Amount (parts) | 6 | 6 | 6 | 6 | 6 | 6 |
| | Particulate binder resin (B) | Kind | Acrylate-based polymer | Acrylate-based polymer | Acrylate-based polymer | Acrylate-based polymer | Acrylate-based polymer | Acrylate-based polymer |
| | | Amount (parts) | 1.5 | 1.5 | 1.5 | 1.5 | 1.5 | 1.5 |
| | Water-soluble polymer (C) | Kind | Polyacrylic resin | Poly-N-vinylacetamide (GE191-103) | PVA (JF-17) | CMC (BSH-12) | — | CMC (BSH-12) |
| | | Amount (parts) | 0.7 | 0.7 | 0.7 | 1.5 | — | 0.8 |
| | Composite (D) | Kind | CEOLUS RC-591, Asahi Kasei Chemicals Corp. (CMC-Na: 11, crystalline cellulose: 89) | CEOLUS RC-591, Asahi Kasei Chemicals Corp. (CMC-Na: 11, crystalline cellulose: 89) | CEOLUS RC-591, Asahi Kasei Chemicals Corp. (CMC-Na: 11, crystalline cellulose: 89) | — | CEOLUS RC-591, Asahi Kasei Chemicals Corp. (CMC-Na: 11, crystalline cellulose: 89) | FD-F20, Asahi Kasei Chemicals Corp. (crystalline cellulose not subjected to surface treatment) |
| | | Amount (parts) | 1.0 | 1.0 | 1.0 | — | 1.5 | 1.0 |
| | | Average particle size (μm) | 8 | 8 | 8 | — | 8 | 20 |
| | Value of weight ratio (C)/(D) | | 0.7 | 0.7 | 0.7 | — | — | 0.8 (Value of (C)/(d")) |
| Evaluation items | Particle strength of composite particles | | B | B | B | C | E | E |
| | Charge and discharge cycle characteristics | | B | B | B | D | E | E |
| | High temperature storage characteristics | | B | B | B | D | E | E |

TABLE 2

| | | | Ex. 10 | Ex. 11 | Ex. 12 | Ex. 13 | Ex. 14 | Ex. 15 |
|---|---|---|---|---|---|---|---|---|
| Composition of composite particles | Electrode active material (A) | Kind | Artificial graphite + SiC | Artificial graphite + SiC | Artificial graphite + SiC | Artificial graphite + SiC | Artificial graphite | Artificial graphite |
| | | Amount (parts) | 91.1 + 6.6 | 91.1 + 6.6 | 91.0 + 6.6 | 90.6 + 6.6 | 97.7 | 97.6 |
| | Particulate binder resin (B) | Kind | SBR | SBR | SBR | SBR | Acrylate-based polymer | SBR |
| | | Amount (parts) | 1.4 | 1.4 | 1.4 | 1.4 | 1.4 | 1.2 |
| | Water-soluble polymer (C) | Kind | CMC (BSH-12) | CMC (BSH-12) | CMC (BSH-12) | CMC (BSH-12) | CMC (BSH-12) | Polyacrylic resin |
| | | Amount (parts) | 0.3 | 0.3 | 0.2 | 1.3 | 0.3 | 0.4 |
| | Composite (D) | Kind, Composition | CEOLUS RC-591, Asahi Kasei Chemicals Corp. (CMC-Na: 11, crystalline cellulose: 89) | CEOLUS RC-N-30, Asahi Kasei Chemicals Corp. (xanthan gum: 5, dextrin: 20, crystalline cellulose: 75) | CEOLUS RC-591, Asahi Kasei Chemicals Corp. (CMC-Na: 11, crystalline cellulose: 89) | CEOLUS RC-591, Asahi Kasei Chemicals Corp. (CMC-Na: 11, crystalline cellulose: 89) | CEOLUS RC-591, Asahi Kasei Chemicals Corp. (CMC-Na: 11, crystalline cellulose: 89) | CEOLUS RC-591, Asahi Kasei Chemicals Corp. (CMC-Na: 11, crystalline cellulose: 89) |
| | | Amount (parts) | 0.6 | 0.6 | 0.8 | 0.1 | 0.6 | 0.8 |
| | | Average particle size (μm) | 8 | 8 | 8 | 8 | 8 | 8 |
| | Value of weight ratio (C)/(D) | | 0.5 | 0.5 | 0.25 | 13 | 0.5 | 0.5 |
| Evaluation items | Particle strength of composite particles | | A | A | A | B | A | B |
| | Charge and discharge cycle characteristics | | A | A | A | B | B | B |
| | High | | A | A | A | B | B | B |

TABLE 2-continued temperature storage characteristics

| | | | Ex. 16 | Ex. 17 | Comp. Ex. 4 | Comp. Ex. 5 | Comp. Ex. 6 |
|---|---|---|---|---|---|---|---|
| Composition of composite particles | Electrode active material (A) | Kind | Artificial graphite | Artificial graphite | Artificial graphite | Artificial graphite | Artificial graphite |
| | | Amount (parts) | 97.6 | 97.6 | 97.7 | 97.7 | 97.7 |
| | Particulate binder resin (B) | Kind | SBR | SBR | SBR | SBR | SBR |
| | | Amount (parts) | 1.2 | 1.2 | 1.4 | 1.4 | 1.4 |
| | Water-soluble polymer (C) | Kind | Poly-N-vinylacetamide (GE191-103) | PVA (JF-17) | CMC (BSH-12) | — | CMC (BSH-12) |
| | | Amount (parts) | 0.4 | 0.4 | 0.9 | — | 0.4 |
| | Composite (D) | Kind, Composition | CEOLUS RC-591, Asahi Kasei Chemicals Corp. (CMC-Na: 11, crystalline cellulose: 89) | CEOLUS RC-591, Asahi Kasei Chemicals Corp. (CMC-Na: 11, crystalline cellulose: 89) | — | CEOLUS RC-591, Asahi Kasei Chemicals Corp. (CMC-Na: 11, crystalline cellulose: 89) | FD-F20, Asahi Kasei Chemicals Corp. (crystalline cellulose not subjected to surface treatment) |
| | | Amount (parts) | 0.8 | 0.8 | — | 0.9 | 0.6 |
| | | Average particle size (μm) | 8 | 8 | — | 8 | 20 |
| | Value of weight ratio (C)/(D) | | 0.5 | 0.5 | — | — | 0.67 (Value of (C)/(d")) |
| Evaluation items | | Particle strength of composite particles | B | B | D | C | E |
| | | Charge and discharge cycle characteristics | B | B | D | D | E |
| | | High temperature storage characteristics | B | B | D | D | E |

As presented in Tables 1 and 2, the particle strength of the composite particles for an electrochemical device electrode containing the electrode active material (A), the particulate binder resin (B), the water-soluble polymer (C), and the composite (D) of the water-soluble polymer (d') and the crystalline cellulose (d") is favorable, and the charge and discharge cycle characteristics and high temperature storage characteristics of the lithium ion secondary battery obtained by using these composite particles are favorable.

The invention claimed is:

1. A method for manufacturing an electrochemical device electrode using composite particles for an electrochemical device electrode having an electrode active material (A), a particulate binder resin (B), a water-soluble polymer (C), and a composite (D) of a water-soluble polymer (d') and crystalline cellulose (d"), the method comprising:

a step of obtaining the composite (D) by wet mixing and drying the crystalline cellulose (d") and the water-soluble polymer (d') containing a cellulose-based polymer and/or a polysaccharide-based polymer, the composite being the crystalline cellulose (d") surface-treated with the water-soluble polymer (d') containing a cellulose-based polymer and/or a polysaccharide-based polymer;

a step of preparing a slurry for composite particles having a viscosity of 10 to 3,000 mPa·s by dispersing or dissolving the electrode active material (A), the particulate binder resin (B), the water-soluble polymer (C), and the composite (D) in a solvent;

a step of obtaining composite particles for an electrochemical device electrode by spray drying the slurry for composite particles; and a step of molding the composite particles into an electrode active material layer by supplying the composite particles on a current collector, followed by the composite particles being directly subjected to pressure molding on the current collector, wherein the particulate binder resin (B) is a conjugated diene-based polymer or an acrylate-based polymer, the water-soluble polymer (C) is at least one selected from the group of a cellulose-based polymer, polyacrylic acid, polyvinyl alcohol, and poly-N-vinylacetamide, 1 to 15 parts by weight of the particulate binder resin (B) on a dry weight basis are contained with respect to 100 parts by weight of the electrode active material (A), 0.2 to 1.3 parts by weight of the water-soluble polymer (C) are contained with respect to 100 parts by weight of the electrode active material (A), 0.1 to 1.2 parts by weight of the composite (D) are contained with respect to 100 parts by weight of the electrode active material (A), and a weight ratio (C)/(D) of the water-soluble polymer (C) to the composite (D) is 0.2 to 15.

2. The method for manufacturing an electrochemical device electrode according to claim 1, wherein the composite (D) has a property of being dispersed in water.

3. The method for manufacturing an electrochemical device electrode according to claim 1, wherein a primary average particle size of the composite (D) is 10 μm or less.

4. The method for manufacturing an electrochemical device electrode according to claim 1, wherein the composite particles further have an electroconductive agent (E).

\* \* \* \* \*